O. Z. Petton,
Beer Pitcher.
No. 28,771. Patented June 19, 1860.
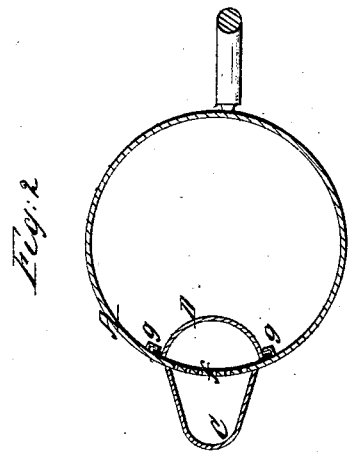
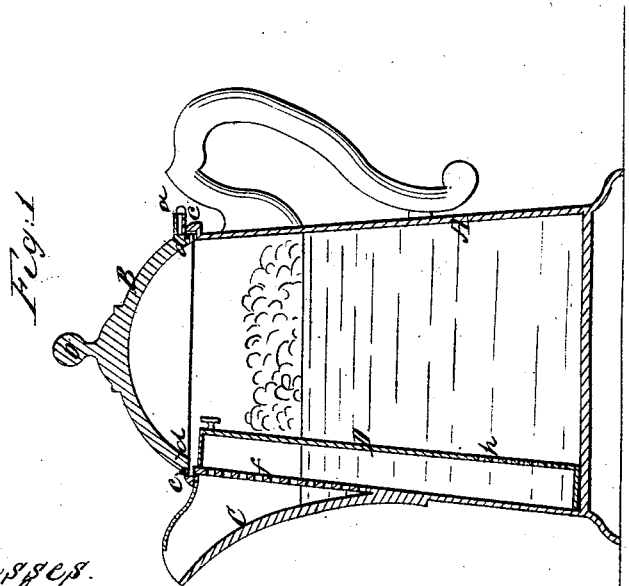
Witnesses.
Chas Crux
C. W. Hughes
Inventor
Oliver Z. Petton

UNITED STATES PATENT OFFICE.

O. Z. PELTON, OF MIDDLETOWN, CONNECTICUT.

BEER-PITCHER.

Specification of Letters Patent No. 28,771, dated June 19, 1860.

*To all whom it may concern:*

Be it known that I, O. Z. PELTON, of Middletown, in the county of Middlesex and State of Connecticut, have invented a new and Improved Beer-Pitcher; and I do hereby declare that the following is a full, clear, and exact description of the same, reference being had to the accompanying drawing, forming a part of this specification, in which—

Figure 1 represents a vertical central section of my invention. Fig. 2 a horizontal section of same.

Similar letters of reference in both views indicate corresponding parts.

To enable those skilled in the art to make and use my invention, I will proceed to describe it with reference to the drawing.

A represents a beer pitcher or can constructed of tin, britannia or any other suitable material, and of any desirable size. Its cover B, is attached to the body of the same by means of a hinge $a$, and a knob $b$, serves to open and close said cover.

The cover shuts down into a rim $c$, on the top edge of the pitcher, and in order to make it close tight, it is provided with a groove $d$, near to its edge to receive a ring $e$, of india rubber or any other suitable material. This ring projects slightly beyond the surface of the cover, and if the cover is closed, it shuts down perfectly tight, so that no part of the contents of the pitcher can escape.

The contents of the pitcher are poured out through the spout C, which is furnished with a strainer $f$ in the usual manner. Behind the spout is the movable partition D, which fits into grooves or guides $g$, so that it can be drawn out and put in at pleasure. Instead of making this partition to fit into the guides $g$, it might, however, be attached with a hinge or in any other convenient manner, enabling the same to be brought into such a position that it can easily be cleaned. I prefer, however, to arrange it in such a manner that it can be taken out altogether, so that the inside of the pitcher, as well as the partition itself, can be reached everywhere. If the partition is stationary, the beer is very liable to sour, for in this case it is impossible to reach all the corners in order to clean the pitcher, and in some places the gum contained in the beer will stick to the surface of the pitcher or of the partition causing the beer to sour. This movable partition D, is provided with a strainer $h$, near to its bottom, so that the contents of the pitcher are drawn off from the bottom. The object of this double strainer as is well known is to confine the froth that forms on the surface of the beer in the pitcher, letting out only just enough to give to the beer in the tumbler a lively appearance. With a pitcher of this kind it is of particular advantage to have the cover so arranged that it shuts down tight, as the froth is very liable to escape through any opening or crevice left between the cover and the body of the pitcher, especially if the pitcher is brought in an inclined position. It will be observed that the upper part of the movable partition is curved or bent over so that the froth cannot escape over the top of the partition. My pitcher confines the contents strictly to the interior and by having the partition movable, it preserves its sweetness for any length of time.

I am aware that beer pitchers or beer measures have been made heretofore with double strainers for the purpose of confining the froth in the interior of the vessel, but in all cases the partition containing the bottom strainer is stationary, and the vessel therefore is very liable to sour.

I do not claim broadly the arrangement in a beer pitcher of a double strainer, neither do I claim making the strainer movable, as the same thing has been done in coffee pots, but,

I claim as new and desire to secure by Letters Patent as an improved article of manufacture—

A beer pitcher, having a movable froth partition with a curved top, and a lid provided with a packing ring all as herein shown and described.

OLIVER Z. PELTON.

Witnesses:
 CHAS. CRUX,
 B. GIROUX.